United States Patent
Sugihara (10) Patent No.: US 8,453,437 B2
(45) Date of Patent: Jun. 4, 2013

(54) SECONDARY AIR SUPPLY DEVICE FOR INTERNAL COMBUSTION ENGINE AND CONTROL METHOD OF THE SECONDARY AIR SUPPLY DEVICE

(75) Inventor: Kunihiro Sugihara, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 485 days.

(21) Appl. No.: 12/441,726

(22) PCT Filed: Jan. 28, 2008

(86) PCT No.: PCT/IB2008/000187
§ 371 (c)(1),
(2), (4) Date: Mar. 18, 2009

(87) PCT Pub. No.: WO2008/093203
PCT Pub. Date: Aug. 7, 2008

(65) Prior Publication Data
US 2011/0179780 A1 Jul. 28, 2011

(30) Foreign Application Priority Data

Jan. 29, 2007 (JP) ................................. 2007-017697

(51) Int. Cl.
*F01N 3/00* (2006.01)
(52) U.S. Cl.
USPC .................................. 60/317; 60/307; 60/607
(58) Field of Classification Search
USPC .................. 60/284, 289, 293, 304, 306, 307, 60/607; 417/2, 201, 204, 244
See application file for complete search history.

(56) References Cited

U.S. PATENT DOCUMENTS

| | | | | |
|---|---|---|---|---|
| 3,788,070 | A * | 1/1974 | Camarasa et al. | 60/290 |
| 5,404,717 | A * | 4/1995 | Nogi et al. | 60/274 |
| 5,694,770 | A * | 12/1997 | Bruck et al. | 60/274 |
| 6,094,909 | A * | 8/2000 | Weber et al. | 60/280 |
| 6,729,124 | B2 * | 5/2004 | Baeuerle et al. | 60/285 |
| 7,213,396 | B2 * | 5/2007 | Ries-Mueller et al. | 60/289 |
| 7,222,483 | B2 * | 5/2007 | Oi et al. | 60/289 |
| 7,530,229 | B2 * | 5/2009 | Akita | 60/608 |

(Continued)

FOREIGN PATENT DOCUMENTS

| | | |
|---|---|---|
| DE | 2 027 883 | 12/1971 |
| DE | 80 29 856 U1 | 10/1982 |

(Continued)

OTHER PUBLICATIONS

JP 59-101538 Machine Translation of Abstract on Nov. 5, 2012.*

(Continued)

*Primary Examiner* — Thomas Denion
*Assistant Examiner* — Patrick Maines
(74) *Attorney, Agent, or Firm* — Oblon, Spivak, McClelland, Maier & Neustadt, L.L.P.

(57) ABSTRACT

A secondary air supply device for an internal combustion engine includes: an electric air pump that supplies secondary air into an exhaust pipe of the internal combustion engine; a controller that controls actuation of the electric air pump according to an operating state of the internal combustion engine; and an air flow mechanism that rotates the electric air pump by causing air in the electric air pump to flow. The controller uses the air flow mechanism to rotate the electric air pump before energizing the electric air pump.

14 Claims, 5 Drawing Sheets

U.S. PATENT DOCUMENTS

| | | | | |
|---|---|---|---|---|
| 2002/0083700 | A1* | 7/2002 | Ellmer et al. | 60/278 |
| 2006/0234174 | A1* | 10/2006 | Burrahm et al. | 431/5 |
| 2009/0308471 | A1* | 12/2009 | Heimonen | 137/624.27 |

FOREIGN PATENT DOCUMENTS

| | | | |
|---|---|---|---|
| DE | 3926428 | A1 | 2/1991 |
| DE | 102 03 309 | | 7/2003 |
| FR | 2 196 437 | | 3/1974 |
| JP | 59101538 | A * | 6/1984 |
| JP | 04237827 | A * | 8/1992 |
| JP | 6 74028 | | 3/1994 |
| JP | 7 26946 | | 1/1995 |
| JP | 09256861 | A * | 9/1997 |

OTHER PUBLICATIONS

JP 04-237827 Machine Translation of Abstract on Nov. 5, 2012.*
JP 09-256861 Machine Translation on Nov. 5, 2012.*
Office Action issued Dec. 17, 2010, in Germany Patent Application No. 11 2008 000 249.5 (with English-language Translation).

* cited by examiner

SECONDARY AIR SUPPLY DEVICE FOR INTERNAL COMBUSTION ENGINE AND CONTROL METHOD OF THE SECONDARY AIR SUPPLY DEVICE

INCORPORATION BY REFERENCE

The disclosure of Japanese Patent Application No. 2007-017697 filed on Jan. 29, 2007 including the specification, drawings and abstract is incorporated herein by reference in its entirety.

BACKGROUND OF THE INVENTION

1. Field of the Invention

The present invention relates to a secondary air supply device for an internal combustion engine and a method of controlling the secondary air supply device. More specifically, the present invention relates to a secondary air supply device for an internal combustion engine that actuates an electric air pump to supply secondary air at cold start, and to a control method of the secondary air supply device.

2. Description of the Related Art

Some internal combustion engines for vehicles, such as automobiles, are provided with a secondary air supply device to promote secondary combustion of exhaust air by supplying secondary air into an upstream portion of an exhaust pipe during cold start and similar situations to reduce unburned components (for example, HC and CO) in the exhaust air. The secondary air supply device may include, for example, a pump that pressurizes air and supplies the pressurized to the exhaust pipe of the internal combustion engine, a valve disposed in a secondary air supply path, and control means for controlling actuation of an electric air pump according to, for example, the coolant temperature or other appropriate parameters for the internal combustion engine.

Some conventional secondary air supply devices of this type supply fresh air in the atmosphere to the exhaust pipe by means of the electric air pump, for example. Such devices prevent excessive consumption of electricity by supplying secondary air until after a catalytic converter for purifying exhaust is activated to a certain level (see Japanese Patent Application Publication No. 6-74028 (JP-A-6-74028), for example).

There is also known a technique to reduce the size of an electric air pump by causing supercharged air to be drawn into the air pump in a supercharged engine (see Japanese Patent Application Publication No. 7-26946 (JP-A-7-26946), for example).

In control devices for the conventional vehicles described above, however, the inrush current into the electric air pump may become so large as to cause a temporary excessive drop in the battery voltage, particularly if both the temperature is low and the battery is degraded. As a result, the load on an alternator may increase suddenly and the battery may be degraded easily.

As a countermeasure, it is conceivable to increase the size of the alternator and/or the battery, for example. However, some vehicles may not be able to accommodate a large alternator and/or a large battery. In addition, leaving power management to a power management ECU (electronic control unit) to manage a high-current system (an ECU for power management for a control system of various ECUs mounted on the vehicle that consume a high current and for determining whether to actuate each ECU, the order of actuation, and so on) increases the cost to set up the power management ECU.

Meanwhile, a vehicle stability control system or an electronically controlled brake system may be reset, or a meter or headlights may be turned on and off, if the operating voltage of an internal microcomputer of ECUs for vehicle stability control, braking control, display control, and so on is not maintained. Therefore, it is necessary to restrict an excessive drop in the voltage of the battery powering the ECUs.

Further, the recent demand for high exhaust gas purification performance on vehicles has increased the needs to increase the size of the electric air pump for supplying secondary air, and therefore it has become important to reduce the inrush current into the electric air pump.

SUMMARY OF THE INVENTION

The present invention provides a secondary air supply device for an internal combustion engine that reduces the inrush current into an electric air pump.

A first aspect of the present invention provides a secondary air supply device for an internal combustion engine that includes: an electric air pump for supplying secondary air into an exhaust pipe of an internal combustion engine mounted on a vehicle; and control means for controlling actuation of the electric air pump according to an operating state of the internal combustion engine, further including: air flow means for rotating the electric air pump by causing air in the electric air pump to flow, in which the control means rotates the electric air pump by means of the air flow means before energizing the electric air pump.

According to this construction, the rotation of the electric air pump is initiated by the air flow means before the electric air pump is energized and started. Thus, it is possible to reduce the load to rotate the electric air pump when it is started and hence the inrush current into the electric air pump, thereby preventing the load on an alternator from increasing suddenly due to a drop in the battery voltage, and a battery from being degraded. Also, it is possible to ensure the operating voltage of ECUs for other systems. In the secondary air supply device for an internal combustion engine having the above construction, the air flow means may pressure-feed air to the electric air pump. According to this construction, it is possible to implement air flow means at a low cost by utilizing the existing electric fan for cooling the engine or the like.

The secondary air supply device for an internal combustion engine in accordance with the first aspect may further include: engine start detection means for detecting that the internal combustion engine will be started by a driver of the vehicle, and the control means may control the air flow means based on information detected by the engine start detection means.

According to this construction, when the internal combustion engine is being started, the rotation of the electric air pump is initiated by air supplied from the air flow means before the start of energization of the electric air pump, thereby reducing the inrush current into the electric air pump when the engine is started. Here, "detecting that the internal combustion engine is about to be started up" means detecting a specific operation that is to be made during a period since a door of the vehicle is opened and the driver is seated on the driver's seat until the driver makes a starting operation to start the internal combustion engine, and includes detecting when the starting operation to start the internal combustion engine has been made or when the starting operation is highly probable.

In the secondary air supply device for an internal combustion engine in accordance with the first aspect, a vacuum switching valve may be provided to switch between a first switch position where a vacuum port of the electric air pump is open to ambient air and a second switch position where the vacuum port is blocked from the ambient air but air from the air flow means is caused to flow into the vacuum port, and the vacuum switching valve may be controlled by the control means to switch.

In this case, the electric air pump can draws in air from the atmosphere when the vacuum switching valve is switched to the first switch position, while the air flow means can pressure-feed air to the vacuum port of the electric air pump when the vacuum switching valve is switched to the second switch position. Thus, the electric air pump smoothly shifts to a secondary air supply operation by switching the vacuum switching valve to the first switch position generally at the same time as the inrush current into the electric air pump is reduced.

In the secondary air supply device for an internal combustion engine in accordance with the first aspect, the air flow means may include an electric fan for cooling the internal combustion engine.

According to this construction, it is possible to implement air flow means at a low cost by utilizing the existing electric fan for cooling the internal combustion engine.

In the secondary air supply device for an internal combustion engine in accordance with the first aspect, a communication state switching valve may be provided to switch between an open position where a discharge port of the electric air pump is communicated with the exhaust pipe of the internal combustion engine and a closed position where the communication is blocked, and the communication state switching valve may be switched by the control means to the closed position when the electric air pump is rotated by the air flow means.

In this case, secondary air will not be unnecessarily supplied to the exhaust pipe of the internal combustion engine.

In the secondary air supply device for an internal combustion engine in accordance with the first aspect, a discharge path switching valve may be provided to switch between a first switch position where a discharge port of the electric air pump is open to the ambient air and a second switch position where the discharge port is blocked from the ambient air but communicated with the exhaust pipe of the internal combustion engine, and the discharge path switching valve may be switched by the control means to the first switch position when the electric air pump is rotated by the air flow means.

In this case, the electric air pump may be rotated by air supplied from the air flow means with the discharge port of the electric air pump open to the ambient air. Therefore, the load to rotate the electric air pump when the electric air pump is energized and started is each reduced to increase the rotational speed when the engine is started. Thus, it is possible to further reduce the inrush current of the electric air pump when the engine is started.

In the secondary air supply device for an internal combustion engine having the engine start detection means, the engine start detection means may detect that a start switch for starting the internal combustion engine is turned on.

According to this construction, it is accurately detected that the internal combustion engine is about to be started. Turning on the start switch includes not only making a starting operation using the start switch but also making such an operation as to be made immediately before starting the engine, such as inserting a key into a keyhole or turning on the power, for example.

In the secondary air supply device for an internal combustion engine having the engine start detection means, the engine start detection means may detect that a door provided in the vehicle is opened, or the engine start detection means may detect that the driver is seated on a seat provided in the vehicle.

In this case, rotation of the electric air pump may be initiated by the air flow means before the internal combustion engine is started. Therefore, it is possible to begin supplying secondary air soon after the internal combustion engine is started while restricting a drop in the battery voltage when the internal combustion engine is started.

The engine start detection means may also detect when a starting operation is highly probable, such as when the attitude or the position of a component around the seat is adjusted.

According to the first aspect of the present invention, the rotation of the electric air pump is initiated by the air flow means before the electric air pump is energized and started. Therefore, it is possible to reduce the load to rotate the electric air pump at startup and hence the inrush current thereinto, thereby preventing the load on the alternator from increasing suddenly due to a drop in the battery voltage, and the battery from being degraded. Also, it is possible to ensure the operating voltage of ECUs for other systems.

A second aspect of the present invention provides a method of controlling a secondary air supply device including an electric air pump that supplies secondary air into an exhaust pipe of an internal combustion engine mounted on a vehicle, the control method including: rotating the electric air pump by causing air in the electric air pump to flow before energizing the electric air pump.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3A is a graph for explaining the effect to reduce the inrush current on startup of the air pump in the secondary air supply device for an internal combustion engine in accordance with the first embodiment.

DETAILED DESCRIPTION OF EMBODIMENTS

Embodiments of the present invention will be described below with reference to the drawings.

First Embodiment

Figure 1:
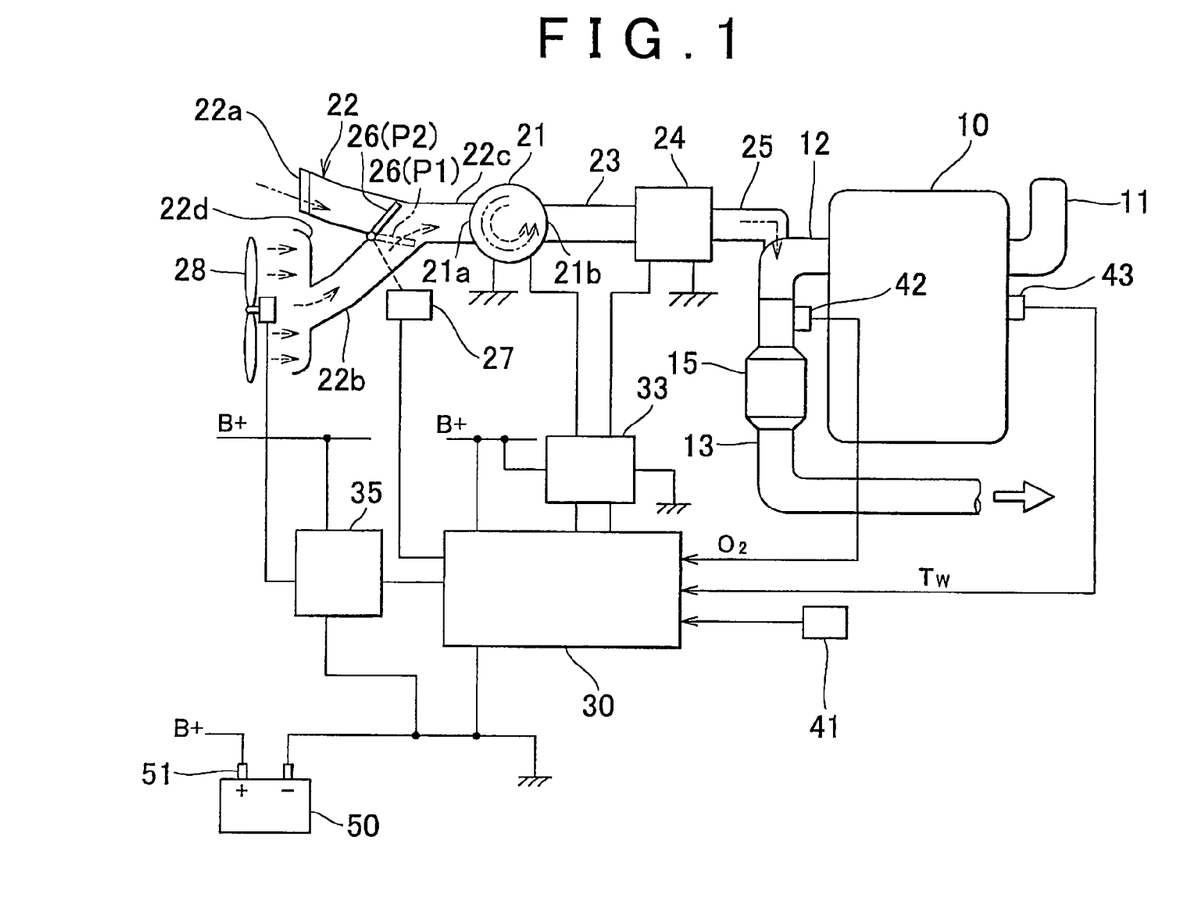
FIG. 1 is a schematic block diagram showing the configuration of an internal combustion engine and a secondary air supply device in accordance with a first embodiment of the present invention.
Figure 2:
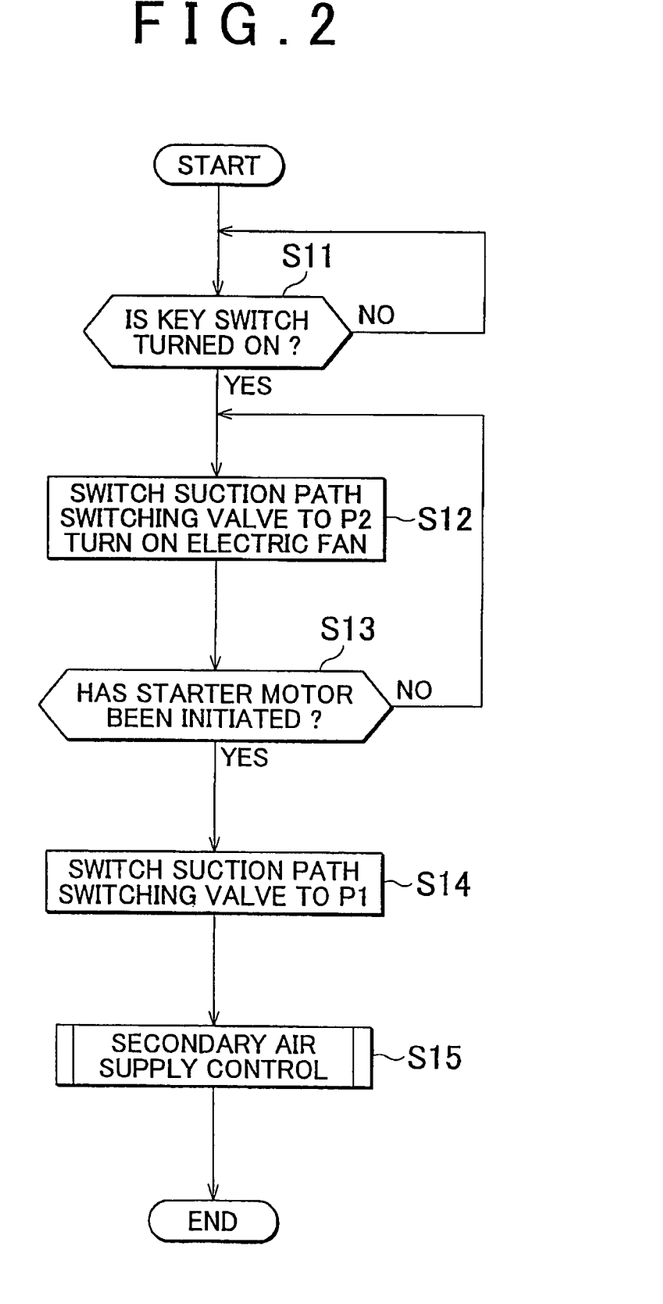
FIG. 2 is a flowchart showing a schematic procedure of a control program for executing a process to be performed before startup of an air pump of the secondary air supply device for an internal combustion engine in accordance with the first embodiment.

FIG. 1 and FIG. 2 show a secondary air supply device for an internal combustion engine in accordance with a first embodiment of the present invention.

The configuration of the device is described first. An engine 10 shown in FIG. 1 is a multi-cylinder internal combustion engine, for example an inline four-cylinder four-cycle engine, mounted on an automobile. An intake manifold 11 (intake pipe) and an exhaust manifold 12 (exhaust pipe) are respectively connected to the engine 10. A catalytic converter 15 for purifying exhaust gas using a three-way catalyst is mounted in an exhaust pipe 13 downstream of the exhaust manifold 12.

Although not shown in detail, a combustion chamber defined by a piston is formed in each cylinder of the engine 10. At an upper part of the combustion chamber, an intake valve, an exhaust valve, and a valve driving mechanism are provided, and an ignition plug is disposed so as to be exposed to the inside of the combustion chamber. A throttle valve is provided in the intake manifold 11 of the engine 10. A plurality of injectors, for example, corresponding the plurality of cylinders are provided on the combustion chamber side with respect to the throttle valve. When the engine 10 is operated, intake air is brought from the upstream intake pipe where an air cleaner is mounted, via the intake manifold 11 sequentially into a cylinder of the engine 10 that is in the intake stroke, while exhaust gas is taken sequentially out of a cylinder that is in the exhaust stroke into the exhaust manifold 12. The exhaust gas is then purified by the catalytic converter 15 and discharged to the outside through a silencer (not shown). An ECU 30 (control means), which functions as a so-called EFI-ECU (an electronic control unit for electronic fuel injection), electronically controls fuel injection by the injectors and ignition by the ignition plugs.

The engine 10 is provided with a secondary air supply device including an electric air pump 21 that supplies secondary air to the exhaust manifold 12 (exhaust pipe) and the ECU 30 that controls actuation of the electric air pump 21 according to the operating state of the engine 10.

The electric air pump 21 has a built-in electric motor for drawing in air from the atmosphere through an air pipe 22 and pressurizing and discharging the drawn-in air as known in the art. The discharged air may be pressure-fed via an air pipe 23, an electromagnetic valve 24 (communication state switching valve), and an air pipe 25 into the exhaust manifold 12 of the engine 10. Here, the electromagnetic valve 24 is made up of, for example, a valve plunger of a check valve type urged by a spring in the direction to close, and an electromagnetic driving coil for driving the valve plunger to open. The electromagnetic valve 24 prohibits reverse flow of exhaust gas from the exhaust manifold side to the electric air pump side due to pulsation of the exhaust gas. The air pipe 25 is branched so as to be connected to the electromagnetic valve 24 and upstream parts of the exhaust manifold 12, for example parts of the exhaust pipes connected to exhaust ports of the respective cylinders of the engine 10. Alternatively, the air pipe 25 may be connected to a collecting part of the exhaust manifold 12 or a part of the exhaust pipe 13 upstream of the catalytic converter 15.

The ECU 30 and a driver circuit 33 control the electric air pump 21 and the electromagnetic valve 24 so that each of the electric air pump 21 and the electromagnetic valve 24 is actuated at respective predetermined timings when starting the engine. The driver circuit 33 includes a relay switch and a driving circuit for each of the electric air pump 21 and the electromagnetic valve 24. The driver circuit 33 energizes the electric air pump 21 according to a pump driving signal from the ECU 30, and drives the electromagnetic valve 24 to open by excitation according to a valve control signal from the ECU 30, using a battery 50 as a power source. The circuitry of the driver circuit 33 for driving the air pump and the electromagnetic valve is known in the art.

The electromagnetic valve 24 serves as a communication state switching valve that switches between an open position where a discharge port 21b of the electric air pump 21 is communicated with the inside of the exhaust manifold 12 of the engine 10 and a closed position where the communication is blocked. When the electric air pump 21 is urged to rotate by air pressure fed from an electric fan 28, that is used to cool the engine 10, as described later, the electromagnetic valve 24 is switched to the closed position by the ECU 30 so that secondary air will not be supplied to the exhaust manifold 12.

The air pipe 22 has a first air induction pipe 22a that serves as an ambient air induction port during operation of the electric air pump 21, a second air induction pipe 22b that extends to the vicinity of the electric fan 28, and collecting pipe 22c that merges the air induction pipes 22a, 22b and connected to a vacuum port 21a of the electric air pump 21.

An upstream opening 22d of the second air induction pipe 22b opens widely in a flared shape so as to take in air blown from the electric fan 28. The air is then pressure fed through the second air induction pipe 22b to the vacuum port 21a of the electric air pump 21. This causes the pressurized air to flow into the electric air pump 21, which rotates a rotor (not shown) in the electric air pump 21 to produce an air flow from the discharge port 21b of the electric air pump 21, allowing the electric air pump 21 to rotate without being energized. That is, the electric fan 28 constitutes air flow means for rotating the electric air pump 21 by producing an air flow through the electric air pump 21 in cooperation with the second air induction pipe 22b of the air pipe 22. The air flow means is not limited to a means that pressure-feeds air to the electric air pump 21, any air flow means may be used that suitably rotates the rotor of the electric air pump 21 by an air flow through the electric air pump 21. For example, the air flow means may be one that produces a pressure difference between the vacuum side and the discharge side of the electric air pump 21 by producing an air flow from the discharge side of the electric air pump 21 (by, for example, reducing the pressure on the discharge side).

The electric fan 28 is controlled by the ECU 30 and a fan controller 35. The fan controller 35 performs duty control of energization of the electric fan 28 according to a pump PWM (pulse width modulation) signal from the ECU 30. That is, the fan controller 35 variably controls the current applied to the electric fan 28 at predetermined time intervals based on the ratio of the ON period to the total period (ON period plus OFF period) determined by the frequency of a pulse signal from the ECU 30 (an air pump rotation request signal).

A vacuum switching valve 26 which is actuated, for example, by a negative pressure is provided at the branch of the air pipe 22 into the air induction pipes 22a, 22b. The vacuum switching valve 26 is switchable between a first switch position P1 (indicated by the phantom line in FIG. 1) where the vacuum port 21a of the electric air pump 21 is open to the ambient air, and a second switch position P2 (indicated by the solid line in FIG. 1) where the vacuum port 21a of the electric air pump 21 is blocked from the ambient air but connected to the air induction pipe 22b, in response to opening and closing of a vacuum solenoid valve 27 controlled by the ECU 30 to open and close. The vacuum switching valve 26 is not necessarily one that utilizes the intake negative pressure, and may alternatively be one that is controlled to open and close by other types of actuator in place of the vacuum solenoid valve 27. Although the vacuum switching valve 26 may be returned to any of the second switch position P2 and the first switch position P1 when the negative pressure is not supplied from the vacuum solenoid valve 27, the vacuum switching valve 26 in this embodiment is urged to return to the first switch position P1.

Meanwhile, the ECU 30 constitutes an EFI-ECU for electronically controlling fuel injection, ignition timing, and so on of the engine 10 as described above. In addition to the function as an EFI-ECU, the ECU 30 rotates the electric air pump 21 with an air flow through the electric air pump 21 (difference in the air pressure before and after the pump) by pressure-feeding air from the electric fan 28 into the second air induction pipe 22b before energizing the electric air pump 21.

The ECU 30, of which hardware configuration is not shown in detail, includes, for example, a central processing unit (CPU), a read only memory (ROM), a random access memory (RAM), a back-up RAM (B-RAM) as a back-up memory utilizing the battery 50. The ECU 30 further includes an input interface circuit including an analog/digital converter and so on, an output interface circuit including a relay circuit and so on, a constant-voltage power source circuit, and so on.

The ROM in this embodiment stores an air pump startup control program to be described later, in addition to programs for fuel injection control, ignition timing control, and so on of the engine 10. The B-RAM stores information on various set values, maps, and so on. The B-RAM may also be sued to store the operating conditions under which the electric air pump 21 may be actuated to supply secondary air into the exhaust pipe 12, the driving conditions of the electric fan 28 and the electric air pump 21 according to the operating state of the engine 10, and so on.

The input interface circuit of the ECU 30 is connected to a key switch 41 (engine start detection means, start switch) for detecting an engine start operation to start the engine 10, an oxygen sensor 42 for detecting the concentration of oxygen (indicated as "$O_2$" in FIG. 1) in the exhaust manifold 12 upstream of the catalytic converter 15, and a coolant temperature sensor 43 for detecting the coolant temperature (indicated as "Tw" in FIG. 1), in addition to an engine speed sensor, an air flow meter, a throttle sensor, a vehicle speed sensor, a cylinder discrimination sensor, an intake air temperature sensor, and so on (not shown). Information from these sensors is retrieved into the ECU 30.

The key switch 41 serves as engine start detection means for detecting the state where a start switch for starting the engine 10 is turned ON, which may include, for example, the insertion of a key by the driver, the start of a key operation, or the depression of a starter button. An ON signal is input to the ECU 30 when engine start operation is made.

The output interface circuit of the ECU 30 is connected to the vacuum solenoid valve 27, the driver circuit 33, and the fan controller 35, in addition to a relay switch circuit that energizes and de-energizes a starter motor (not shown) for cranking the engine 10 using the battery 50 as a power source, electromagnetic driving parts of the injectors, igniters for driving the ignition plugs, a relay switch circuit for turning ON and OFF a fuel pump, and so on. The ECU 30 controls the electric fan 28 based on detected information when the key switch 41 is turned ON.

A positive terminal of an alternator (not shown) is connected to a positive terminal 51 of the battery 50. Electricity is supplied from the alternator to a power line of the battery 50 on the positive terminal 51 side (indicated as "B+" in FIG. 1) when the engine 10 is operated.

The operation is described now.

FIG. 2 is a schematic flowchart showing the flow of a control program that is executed by the secondary air supply device for an internal combustion engine in accordance with the first embodiment. This control program is executed by the ECU 30 at predetermined time intervals, together with other control programs for fuel injection control, ignition timing control, and so on.

First, the ECU 30 determines whether the key switch 41 is turned ON (step S11). When the driver makes a starting operation, for example by inserting a key, the key switch 41 is turned ON to result in a determination of YES.

If the determination is YES, the ECU 30 then excites the vacuum solenoid valve 27 to switch the vacuum switching valve 26 from the first switch position P1, where the vacuum port 21a of the electric air pump 21 is open to the ambient air, to the second switch position P2, where the vacuum port 21a of the electric air pump 21 is blocked from the ambient air but connected to the air induction pipe 22b that extends from the electric fan 28 (if the vacuum switching valve 26 is urged to return to the second switch position P2, the vacuum solenoid valve 27 is not excited to maintain the position of the vacuum switching valve 26). In addition, generally at the same time, the ECU 30 sends a PWM signal to the fan controller 35, which causes the fan controller 35 to start energizing the electric fan 28 with a current controlled to a predetermined duty ratio, for example 100%, according to the PWM signal (step S12).

At this time, air blown from the electric fan 28 is taken into the upstream opening 22d of the air pipe 22 opening widely in a flared shape and pressure-fed into the second air induction pipe 22b. Consequently, pressurized air is supplied to the electric air pump 21, so that the air flow rotates the electric air pump 21, which was stationary when an engine start operation was made with the key switch 41, without the need to energize the electric air pump 21. In this state, the electromagnetic valve 24 is closed to block the communication between the discharge port 21b of the electric air pump 21 and the exhaust manifold 12, so that unnecessary secondary air will not be inducted into the exhaust manifold 12.

Then, the ECU 30 switches ON the engine start relay switch circuit to initiate the starter motor, which starts cranking the engine 10. The ECU 30 also performs electronic control of fuel injection by the injectors and ignition by the ignition plugs to start the engine 10. The starter motor is decoupled from a crankshaft of the engine 10 when the speed of the engine 10 reaches a predetermined speed at which complete combustion occur to allow the engine 10 to keep rotating alone.

Then, it is determined whether the starter motor has been initiated (step S13). At this time, if the starter motor has not been initiated, the vacuum switching valve 26 is held at the second switch position P2 and the electric fan 28 continues to be energized.

On the other hand, if the starter motor has already been initiated (YES in step S13), then the ECU 30 stops exciting the vacuum solenoid valve 27 to switch the vacuum switching valve 26 from the second switch position P2 to the first switch position P1 (step S14).

In addition, the ECU 30 internally checks whether predetermined conditions to provide secondary air, for example whether it is during cold start, are satisfied. If the conditions are satisfied, the ECU 30 switches ON a relay switch located on the energization path from the battery 50 to the electric air pump 21, for the driver circuit 33 to start energizing the electric air pump 21, at the same time as the vacuum switching valve 26 is switched to the first switch position P1. After that, the electromagnetic valve 24 is switched to the open position where the discharge port 21b of the electric air pump 21 is communicated with the exhaust manifold 12 of the engine 10, for the electric air pump 21 to start supplying secondary air to the exhaust manifold 12 (step S15).

Figure 3A:
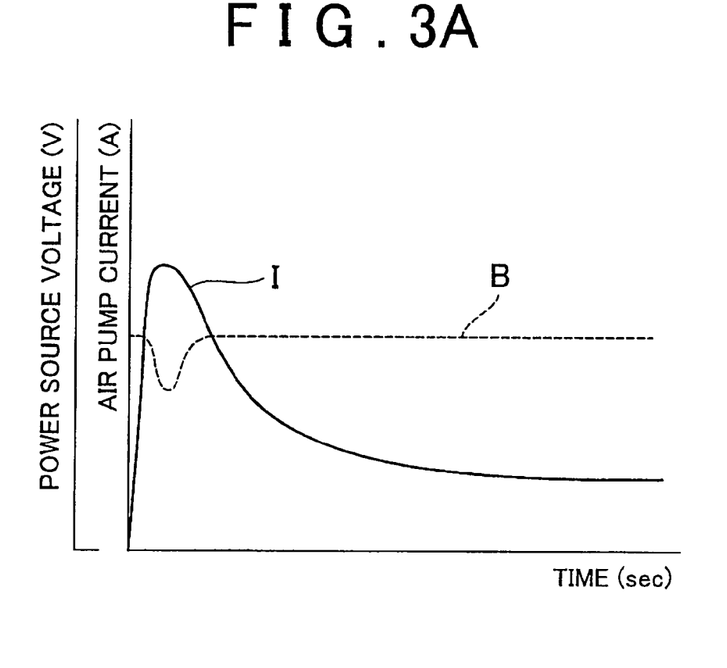
Figure 3B:
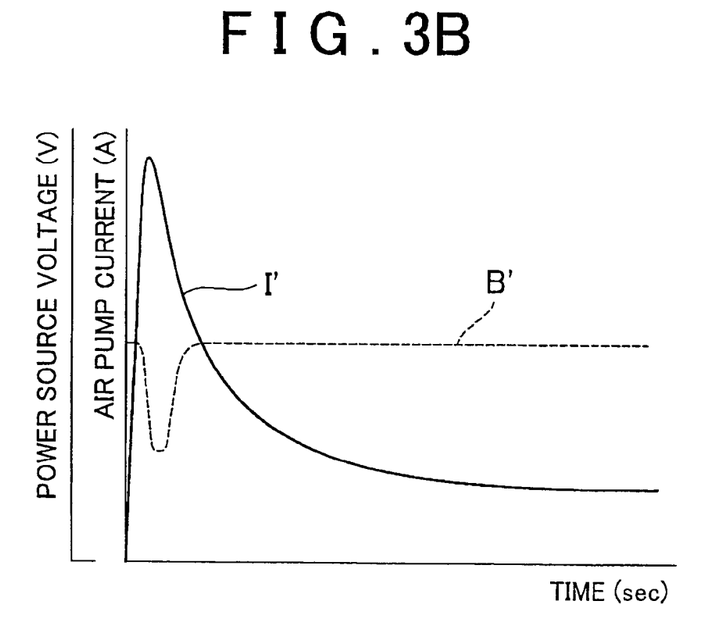
FIG. 3B is a graph showing changes in the inrush current and the power source voltage on startup of the air pump that occur in a secondary air supply device of a comparative example, in both of which the vertical axis represents the power source voltage and the air pump current and the horizontal axis represents the time.

When the electric air pump 21 is started, the electric air pump 21 is rotated by the air in the air pipe 22 and the inertia of the rotor of the electric air pump 21. Therefore, the load to rotate the electric air pump 21 is significantly reduced in comparison with that when the electric air pump 21 is initiated from the state where the air in the air pipe 22 and the rotor of the electric air pump 21 are stationary. Thus, the inrush current to the electric air pump 21 at startup is reduced to air pump current I(A) as indicated in FIG. 3A, which does not lead to a very sudden drop in the voltage level B (for example, 12V) of the power line (the line for supplying the battery voltage indicated as "B+" in FIG. 1). In contrast, if the electric air pump 21 is initiated from the state where the air in the air pipe 22 and the rotor of the electric air pump 21 are stationary, the peak of the inrush current to the electric air pump 21 when it is started would be very high, for example about 225 A, which may reduce the power source voltage level B' to 6-7V.

When the electric air pump 21 has been energized, normal secondary air supply control is performed. For example, when a cold start of the engine 10 is completed, first the electromagnetic valve 24 is switched from the open position where the discharge port 21b of the electric air pump 21 is communicated with the inside of the exhaust manifold 12 of the engine 10 to the closed position where the communication is blocked, and then the ECU 30 switches OFF the relay switch located on the energization path to the electric air pump 21, for the driver circuit 33 to stop energizing the electric air pump 21. In addition, the ECU 30 and the fan controller 35 control the current applied to the electric fan 28 at a duty ratio in accordance with the operating state of the engine 10, the coolant temperature, and so on. Thus, the current applied to the electric fan 28, which has been increased to supply secondary air, is reduced immediately after cold start of the engine 10, for example, and then changes according to the operating state of the engine 10.

As described above, in the first embodiment, the key switch 41 securely detects that the engine 10 will be started, the rotation of the electric air pump 21 is initiated by the air pressure fed from the electric fan 28 before the electric air pump 21 is energized and started. In this way, it is possible to reduce the load to rotate the electric air pump 21 and hence the inrush current of the electric air pump 21 when the engine is started, thereby preventing the load on the alternator from increasing suddenly due to a drop in the battery voltage, and the battery 50 from being degraded.

Thus, it is possible to prevent meters or headlights from being turned on and off as well as the resetting of ECUs for systems that consume greater current than other in-vehicle systems, such as, for example a VSC (vehicle stability control) system and an ECB (electronically controlled brake) system, or an ECU for display control and so on as a result of insufficient operation voltage.

Also in the first embodiment, the electric fan 28 is actuated to initiate rotation of the electric air pump 21 before the electric air pump 21 is energized when the engine 10 is being started. Therefore, it is possible to realize a secondary air supply device that can reduce the inrush current into the electric air pump 21 at startup at a low cost by utilizing the existing electric fan 28.

Further, the electric air pump 21 draws in air from the atmosphere when the vacuum switching valve 26 is switched to the first switch position P1, while the electric fan 28 pressure-feeds air to the vacuum port 21a of the electric air pump 21 when the vacuum switching valve 26 is switched to the second switch position P2. Thus, the electric air pump 21 smoothly shifts to a secondary air supply operation by switching the vacuum switching valve 26 to the first switch position P1 substantially at the same time as the inrush current into the electric air pump 21 is reduced at startup.

In the first embodiment, the key switch 41 directly detects that the engine 10 is about to be started. However, the engine start detection means of this embodiment may detect a preparatory operation by the driver to start the engine as a displacement of a specific member around the driver's seat, such as a door of the vehicle getting opened or the driver getting seated on the driver's seat. The engine start detection means may detect not only a state where a engine start operation has been made but also a state where an engine start operation is highly probable.

Second Embodiment

Figure 4:
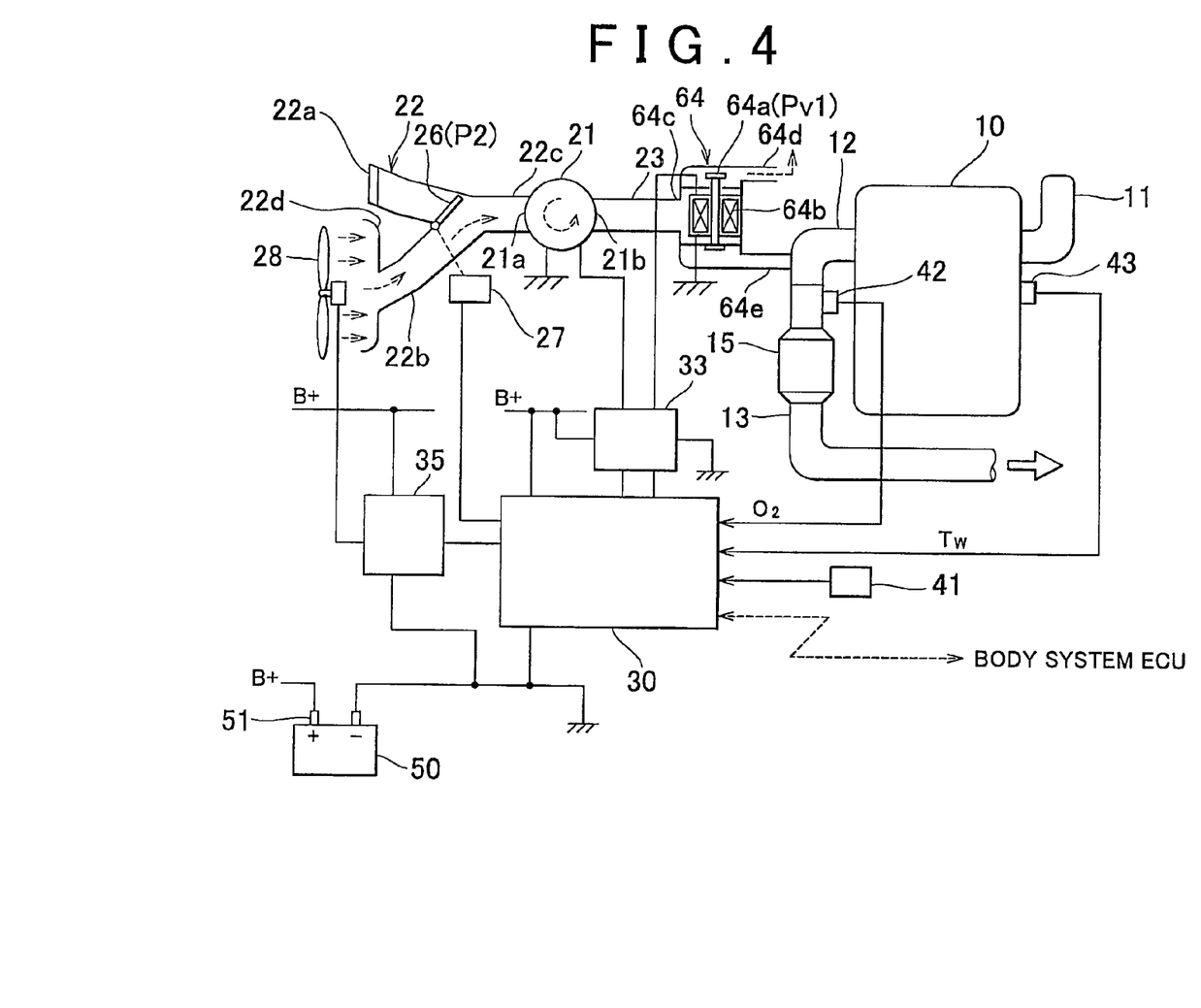
FIG. 4 is a schematic block diagram showing the configuration of an internal combustion engine and a secondary air supply device in accordance with a second embodiment of the present invention.
Figure 5:
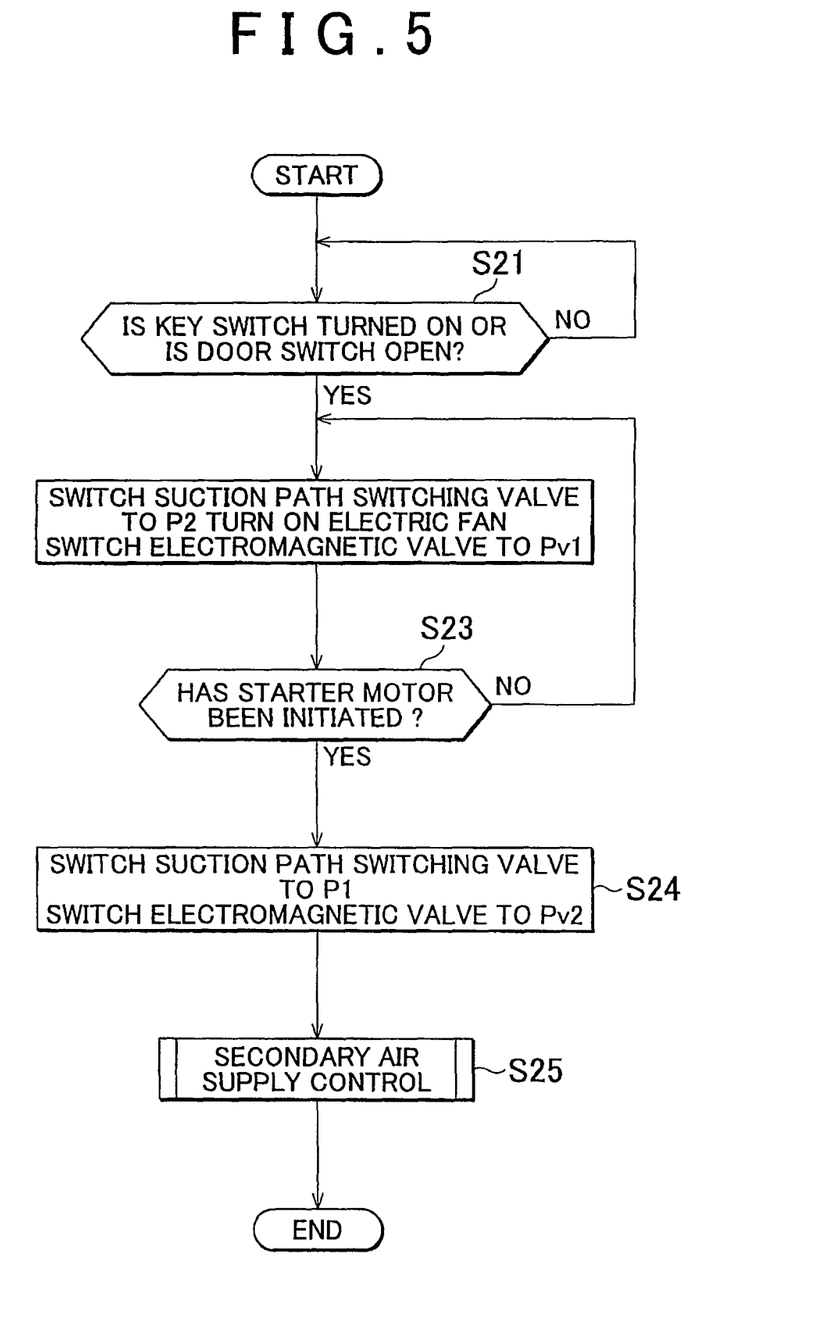
FIG. 5 is a flowchart showing a schematic procedure of a control program for executing a process that is performed before startup of an air pump of the secondary air supply device for an internal combustion engine in accordance with the second embodiment.

FIG. 4 and FIG. 5 show a secondary air supply device for an internal combustion engine in accordance with a second embodiment of the present invention.

The second embodiment is similar to the first embodiment except for a part where secondary air is supplied from a discharge path switching valve disposed on the discharge side of the electric air pump to the exhaust pipe. In FIG. 4, the same components as those of the first embodiment shown in FIG. 1 are given the same reference numerals. The difference is described below.

In the secondary air supply device for an internal combustion engine in accordance with the second embodiment, an electromagnetic valve 64 (discharge path switching valve) that switches the discharge path is provided between the electric air pump 21 and the exhaust manifold 12. The electromagnetic valve 64 has a valve plunger 64a and an electromagnetic coil 64b that axially displaces the valve plunger 64a. The valve plunger 64a of the electromagnetic valve 64 is switchable between a first switch position Pv1 indicated in FIG. 4, and a second switch position Pv2 below the position indicated in FIG. 4, according to the energization (excitation) state of the electromagnetic coil 64b. The electromagnetic valve 64 also has an inlet port 64c connected to the air pipe 23, an ambient air port 64d open to the ambient air, and a secondary air outlet port 64e communicated with the inside of the exhaust manifold 12. When the valve plunger 64a is in the first switch position Pv1, the discharge port 21b of the electric air pump 21 is open to the ambient air. When the valve plunger 64a is in the second switch position Pv2, the discharge port 21b of the electric air pump 21 is communicated with the inside of the exhaust manifold 12 of the engine 10.

When the electric air pump 21 is rotated by air pressure fed from the electric fan 28, the ECU 30 switches the electromagnetic valve 64 to the first switch position Pv1 to emit air discharged from the discharge port 21b of the electric air pump 21 to the ambient air. When the electric air pump 21 is energized once predetermined conditions to supply secondary air are satisfied, the ECU 30 switches the electromagnetic valve 64 to the second switch position Pv2 to supply secondary air from the discharge port 21b of the electric air pump 21 to the exhaust manifold 12 of the engine 10.

The ECU 30 also receives from a body ECU a door open signal from a door switch (engine start detection means) (not shown) for detecting whether a door (not shown) provided in the vehicle is opened or closed. When the key switch 41 is operated by the driver or the door to the driver's seat is opened at cold start, for example, the ECU 30 preliminarily rotates the electric air pump 21 with the electric fan 28 shortly before or when then engine 10 is started.

FIG. 5 is a schematic flowchart showing the flow of a control program that is executed by the secondary air supply device for an internal combustion engine in accordance with the second embodiment. The control program is executed by the ECU 30 at predetermined time intervals, together with other control programs, such as the fuel injection control, ignition timing control, and so on.

First, it is determined whether the key switch 41 is turned ON or a door open signal is input (step S21). If the determination is YES, the vacuum solenoid valve 27 is excited to switch the vacuum switching valve 26 from the first switch position P1 where the vacuum port 21a of the electric air pump 21 is open to the ambient air to the second switch position P2 where the vacuum port 21a of the electric air pump 21 is connected to the air induction pipe 22b that extends from the electric fan 28. In addition, generally at the same time, the ECU 30 sends a PWM signal to the fan controller 35, which causes the fan controller 35 to start energizing the electric fan 28 with a current controlled to a predetermined duty ratio, for example 100%, according to the PWM signal. Further, the electromagnetic coil 64b is energized (excited) to switch the valve plunger 64a of the electromagnetic valve 64 to the first switch position Pv1 where the discharge port 21b of the electric air pump 21 is open to the ambient air (step S22).

At this time, air blown from the electric fan 28 is taken into the upstream opening 22d of the air pipe 22 and pressure-fed into the second air induction pipe 22b. Consequently, pressurized air is supplied to the electric air pump 21, so that the air flowing into and out of the electric air pump 21 starts rotating the electric air pump 21, which was stationary at the moment when the engine 10 is started, without energizing the electric air pump 21. In this state, the electromagnetic valve 64 is in the first switch position Pv1 where the communication between the discharge port 21b of the electric air pump 21 and the exhaust manifold 12 is blocked, so that unnecessary secondary air will not be inducted into the exhaust manifold 12 and air coming out of the discharge port 21b of the electric air pump 21 will be emitted into the ambient air.

Then, the ECU 30 switches ON the relay switch circuit to start the engine to initiate the starter motor, which cranks the engine 10. The ECU 30 also performs electronic control of fuel injection by the injectors and ignition by the ignition plugs to start the engine 10.

Then, it is determined whether the starter motor has been initiated (step S23). At this time, if the starter motor has not been initiated, the vacuum switching valve 26 is held at the second switch position P2, the electric fan 28 continues being energized, and the electromagnetic valve 64 is held at the first switch position Pv1.

On the other hand, if the starter motor has already been initiated (YES in step S23), then the ECU 30 stops exciting the vacuum solenoid valve 27 to switch the vacuum switching valve 26 from the second switch position P2 to the first switch position P1 (step S24).

In addition, the ECU 30 checks whether predetermined conditions to supply secondary air, for example whether it is a cold start, are satisfied. If the conditions are satisfied, the ECU 30 switches ON a relay switch located on the energization path from the battery 50 to the electric air pump 21, for the driver circuit 33 to start energizing the electric air pump 21, at the same time as the vacuum switching valve 26 is switched to the first switch position P1. After that, the electromagnetic valve 64 is switched to the second switch position Pv2, where the discharge port 21b of the electric air pump 21 is communicated with the inside of the exhaust manifold 12 of the engine 10, for the electric air pump 21 to start supplying secondary air into the exhaust manifold 12 (step S25).

When the electric air pump 21 is started, it has been rotated by the air in the air pipe 22 and the inertia of the rotor of the electric air pump 21 itself. Therefore, the load to rotate the electric air pump 21 is significantly reduced in comparison to that when the electric air pump 21 is started when the air in the air pipe 22 and the rotor of the electric air pump 21 itself were stationary. Thus, the inrush current into the electric air pump 21 when it is started may be reduced as in the first embodiment, which does not lead to a significant drop in the voltage level of the power line (the line for supplying the battery voltage indicated as "B+" in FIG. 4).

After the start of energization of the electric air pump 21, normal secondary air supply control is performed. For example, when cold startup of the engine 10 is completed, first the electromagnetic valve 64 is switched from the second switch position Pv2, where the discharge port 21b of the electric air pump 21 is communicated with the inside of the exhaust manifold 12 of the engine 10, to the first switch position Pv1, where the communication is blocked but the discharge port 21b of the electric air pump 21 is open to the ambient air, and then the ECU 30 switches OFF the relay switch located on the energization path to the electric air pump 21, for the driver circuit 33 to stop energizing the electric air pump 21.

Also in the second embodiment, the electric air pump 21 is rotated by causing the electric fan 28 to produce an air flow through the electric air pump 21 while the discharge port 21b of the electric air pump 21 is open to the ambient air. Therefore, the load to rotate the electric air pump 21 at startup by energization is reduced. Thus, it is possible to reduce the inrush current into the electric air pump 21 at startup by energization.

In addition, the ECU 30 switches the electromagnetic valve 64 as a discharge path switching valve to the first switch position Pv1 when the electric air pump 21 is rotated by air supplied from the electric fan 28. Therefore, the load to rotate the electric air pump 21 at the start of rotation and at startup by energization is each reduced, which increases the rotational speed at startup. Thus, it is possible to further reduce the inrush current at startup.

Further, the rotation of the electric air pump 21 may be initiated by the electric fan 28 before starting the engine 10. Therefore, it is possible to start supplying secondary air soon after startup of the engine 10 while restricting a drop in the battery voltage at startup of the engine 10, thereby improving the exhaust gas purification performance.

As has been described above, in the present invention, the rotation of the electric air pump is initiated by the air flow means before the electric air pump is energized and started. Therefore, it is possible to reduce the load to rotate the electric air pump thereby reducing the inrush current when the electric air pump is started, which prevents the load on the alternator from increasing suddenly due to a drop in the battery voltage, and the battery from being degraded. Also, it is possible to ensure the operating voltage of ECUs for other systems. The present invention is useful for a secondary air supply device for an internal combustion engine, and more specifically for a secondary air supply device for an internal combustion engine that actuates an electric air pump for supplying secondary air during cold starts and so on.

The invention claimed is:

1. A secondary air supply device for an internal combustion engine, comprising:
    an electric air pump that supplies secondary air into an exhaust pipe of the internal combustion engine mounted on a vehicle;
    an electronic control unit programmed to control actuation of the electric air pump according to an operating state of the internal combustion engine; and
    an electric fan upstream of the electric air pump that pressurizes air and feeds the air to the electric air pump, the air causing the electric air pump to rotate and the air being supplied to the exhaust pipe,
    wherein the electronic control unit is programmed to rotate the electric air pump with the electric fan before energizing the electric air pump.

2. The secondary air supply device according to claim 1, further comprising:
    one of a key switch and a door switch that each detects that the internal combustion engine is about to be started by a driver of the vehicle, wherein the electronic control unit is programmed to control the electric fan based on information detected by the one of the key switch and the door switch.

3. The secondary air supply device according to claim 2, wherein the key switch detects that a start switch that starts the internal combustion engine is turned on.

4. The secondary air supply device according to claim 2, wherein the door switch detects that a door provided in the vehicle is opened.

5. The secondary air supply device according to claim 1, wherein a vacuum switching valve is provided that switches between a first switch position, where a vacuum port of the electric air pump is open to ambient air, and a second switch position, where the vacuum port is blocked from the ambient air but air from the electric fan is caused to flow into the vacuum port, and the vacuum switching valve is controlled by the electronic control unit.

6. The secondary air supply device according to claim 1, wherein the electric fan cools the internal combustion engine.

7. The secondary air supply device according to claim 1, wherein a communication state switching valve is provided that switches between an open position, where a discharge port of the electric air pump is communicated with the exhaust pipe of the internal combustion engine, and a closed position, where the communication is blocked, and the communication state switching valve is switched by the electronic control unit to the closed position when the electric air pump is rotated by the electric fan.

8. The secondary air supply device according to claim 7, further comprising:
    a driver circuit including a relay that energizes the electric air pump to supply the secondary air into the exhaust pipe and energizes the communication state switching valve to the open state.

9. The secondary air supply device according to claim 1, wherein a discharge path switching valve is provided that switches between a first switch position, where a discharge port of the electric air pump is open to the ambient air, and a second switch position, where the discharge port is blocked from the ambient air but communicated with the exhaust pipe of the internal combustion engine, and the discharge path switching valve is switched by the electronic control unit to the first switch position when the electric air pump is rotated by the electric fan.

10. The secondary air supply device according to claim 1, wherein the electric fan produces a pressure difference between a vacuum side and a discharge side of the electric air pump.

11. The secondary air supply device according to claim 1, wherein the electric air pump includes an electric motor.

12. The secondary air supply device according to claim 1, further comprising:
    a driver circuit including a relay that energizes the electric air pump to supply the secondary air into the exhaust pipe.

13. The secondary air supply device according to claim 1, wherein the electric fan pressurizes the air and feeds the air to the electric air pump before starting the internal combustion engine.

14. A secondary air supply device for an internal combustion engine, comprising:
    an electric air pump that supplies secondary air into an exhaust pipe of the internal combustion engine mounted on a vehicle;
    an electronic control unit programmed to control actuation of the electric air pump according to an operating state of the internal combustion engine; and
    an electric fan that rotates the electric air pump by causing air in the electric air pump to flow, wherein
    the electronic control unit is programmed to rotate the electric air pump with the electric fan before energizing the electric air pump, and
    the electric fan cools the internal combustion engine.

* * * * *